United States Patent Office 2,774,799
Patented Dec. 18, 1956

2,774,799

SELECTIVE DEHYDROHALOGENATION OF FLUOROHALOALKANES USING A COPPER CATALYST

Russell M. Mantell, Orange, and William S. Barnhart, Cranford, N. J., assignors to The M. W. Kellogg Company, Jersey City, N. J., a corporation of Delaware No Drawing. Application April 1, 1954,
Serial No. 420,452

6 Claims. (Cl. 260—653)

This invention relates to a process for selectively dehydrohalogenating fluorine containing halogenated organic compounds. In one of its aspects, this invention relates to a process for selectively dehydrochlorinating fluorochloroalkanes. This invention has as one of its particular aspects the dehydrochlorination of chlorodifluoroethane to produce vinylidene fluoride.

Recent advances in the art of polymerizing fluorinated olefins has led to the development of a number of methods for the production of the necessary olefinic starting materials. Starting with a compound which contains hydrogen and chlorine, techniques have been described whereby hydrogen chloride is split off from the molecule using caustic solutions. Reactions have also been disclosed for splitting off non-fluorine halogen using metallic zinc dispersed in alcohol. Thermal reactions either catalytic or non-catalytic are described in the literature. To date all of the available methods of producing fluorine containing olefin monomers are deficient in that the end product is usually contaminated with a number of impurities which are produced by side reactions inherent in the method employed. For example, in the production of vinylidene fluoride from 1,1,1-chlorodifluoroethane large quantities of vinylidene fluorochloride are also produced. The presence of vinylidene fluorochloride is highly objectionable in most of the polymerization reactions in which vinylidene fluoride is used. Thus, when vinylidene fluoride is copolymerized with trifluorochloroethylene a quantity of the fluoro-chloride in excess of about 1 mol percent precludes the preparation of the desired copolymer. Usually, for the production of this copolymer less than about 0.5 mol percent of impurities can be tolerated.

It is an object of this invention to provide a dehydrohalogenation process which preferentially removes high molecular weight halogens.

It is another object of this invention to provide a dehydrohalogenation process which facilitates the production of end product containing minimal quantities of impurities.

It is another object of this invention to provide a process for preparing fluorine containing olefinic monomers.

Various other objects of the present invention will become apparent to those skilled in the art.

The above objects are accomplished by passing the starting material which contains at least one hydrogen atom and one halogen atom other than fluorine through a reaction zone maintained at a temperature between about 500° C. and about 730° C. for a contact or residence time of between about 1 and about 60 seconds in the presence of a copper catalyst.

The starting materials which may be converted by the process of this invention, are those compounds which contain a hydrogen atom and a halogen atom other than fluorine on adjacent carbon atoms. The adjacent carbon atoms may additionally be bonded to alkyl, aryl, halogen or hydrogen substitutents. Preferred starting compounds, are those which contain 2 to 3 carbon atoms and on adjacent carbon atoms a hydrogen and a halogen other than fluorine. This invention is particularly adapted to the dehydrohalogenation of halogenated ethanes which contain at least one fluorine substituent and at least one hydrogen and chlorine on adjacent carbon atoms. This invention particularly contemplates the dehydrochlorination of 1,1,1-chlorodifluoroethane and 1-chloro 2,2-difluoroethane to produce vinylidene fluoride. Additionally, compounds such as 1,1-dichloro 1,2,2-trifluoroethane may be dehydrochlorinated to produce trifluorochloroethylene.

As will become more evident hereinafter, this invention presents a preferential dehydrohalogenation technique which is effected by the use of a copper catalyst in conjunction with a critical residence or contact timetemperature relationship. The residence or contact time is maintained between about 1 and about 60 seconds, while the temperature is between about 500° C. and about 730° C. Higher residence times are employed at lower temperatures. Preferably the temperature is maintained between about 625° C. and about 675° C. with a residence or contact time between about 5 and about 30 seconds. More preferably, the temperature is maintained between about 630° C. and about 660° C. and the contact or residence time is between about 10 and about 25 seconds. At temperatures below 500° C. the selectivity of the reaction is materially reduced and high proportions of side products are produced. Temperatures above 730° C. are also non-selective, while temperatures considerably in excess of 730° C. cause coking. Reactions may be carried out at reduced or elevated pressures. Autogeneous pressure is preferred.

In the specification and in the tables of data, terms are used which for purposes of clarity are defined below.

$$\text{Contact time} = \frac{\text{Bulk volume of catalyst}}{\text{Volume of reactant per second at S. T. P. charged}}$$

$$\text{Residence time} = \frac{\text{Volume of (empty) reactor}}{\text{Volume of reactant per second at S. T. P. charged}}$$

$$\text{Activity} = \frac{\text{Moles of reactant reacted}}{\text{Moles of reactant charged}}$$

$$\text{Conversion} = \frac{\text{Moles of desired product formed}}{\text{Moles of reactant charged}}$$

$$\text{Selectivity} = \frac{\text{Moles of desired product formed}}{\text{Moles of reactant reacted}}$$

In order to illustrate the process of this invention, the following tables of data are presented below. The data of Table I was obtained by passing the indicated quantities of starting material through a heated reactor. The reactor consisted of a copper tube 28 inches in length by 0.75 inch inside diameter capped with 24/40 female joints at each end and surrounded by a tubular furnace of 17 inch length. The figures given in the columns under gas samples are mol percents of effluent after the effluent had been washed free of acid constituents and dried.

TABLE I

| Residence time,[1] seconds | Reactor, °C. | $CF_2Cl-CH_3$ M. min. | Gas samples | | | | |
|---|---|---|---|---|---|---|---|
| | | | $CF_2Cl-CH_3$ | $CF_2=CH_2$ | $CH_2=CFCl$ | $CF_3-CH_3$ | Dimer, etc. |
| 10 | 300 | .018 | | | | | |
| 13 | 500 | .02 | 97.5 | 0.0 | 2.5 | 0.0 | 0.0 |
| 26 | 500 | .01 | 91.8 | 8.1 | 0.1 | | |
| 13 | 600 | .02 | 77.2 | 22.6 | 0.2 | | |
| 26 | 610 | .01 | 9.8 | 88.9 | 0.7 | 0.3 | 0.3 |
| 13 | 650 | .02 | 8.4 | 90.4 | 0.7 | 0.5 | 0.3 |
| 26 | 650 | .01 | 1.0 | 97.8 | 0.7 | 0.3 | 0.1 |
| 13 | 700 | .02 | 0.7 | 97.8 | 0.3 | 0.2 | 0.2 |
| 26 | 700 | .01 | 0.5 | 97.2 | 0.9 | 0.3 | 0.2 |
| 26 | 730 | .01 | 0.5 | 95.6 | 1.3 | 0.9 | 0.1 |
| 15 | 650 | .02 | 0.8 | 95.4 | 1.3 | 0.8 | 0.1 |
| 15 | 645 | .02 | 1.0 | 98.0 | 0.5 | 0.2 | 0.3 |
| 15 | 645 | .02 | 0.7 | 98.4 | 0.5 | 0.1 | 0.3 |
| 15 | 655 | .02 | 0.5 | 98.6 | 0.5 | 0.1 | 0.3 |
| 15 | 650 | .02 | 0.7 | 97.9 | 0.6 | 0.2 | 0.5 |
| 15 | 660 | .02 | 0.5 | 98.4 | 0.7 | 0.1 | 0.3 |
| 15 | 630 | .02 | 0.6 | 97.7 | 0.9 | 0.3 | 0.5 |
| 15 | 660 | .02 | 2.1 | 97.2 | 0.5 | 0.1 | 0.1 |
| 15 | 650 | .02 | 0.9 | 98.3 | 0.5 | 0.1 | 0.2 |
| 15 | 645 | .02 | 3.3 | 95.6 | 0.6 | 0.2 | 0.3 |
| 15 | 640 | .02 | 0.4 | 98.8 | 0.4 | 0.1 | 0.3 |
| 15 | 655 | .02 | 0.6 | 98.1 | 0.6 | 0.1 | 0.2 |
| | | | 0.7 | 98.4 | 0.6 | 0.1 | 0.2 |

[1] Residence times are given at S. T. P. as noted in column 2 lines 46—48 on Page 4.

The runs described in Table II, below, were made in a continuous operation conducted during the indicated time. The equipment described with reference to the data of Table I was employed.

TABLE II

| Time, hours | Reactor, °C. | $CF_2Cl-CH_3$ M.₂/min. | Gms. product recovered | Seconds residence time | Gas samples | | | | |
|---|---|---|---|---|---|---|---|---|---|
| | | | | | $CF_2=CH_2$ | $CF_2Cl=CH_3$ | $CH=CFCl$ | $CF_3=CH_3$ | Dimer, etc. |
| 8 | 650 | 0.02 | 450 | 13 | 98.2 | 0.6 | 0.7 | 0.2 | 0.3 |
| 4 | 650 | .02 | 255 | 13 | 98.2 | 0.6 | 0.7 | 0.2 | 0.3 |

In the runs presented in Table II, yield was 97.4%, activity 99.3%, conversion 94.0% and selectivity 94.4%.

The following table illustrates the use of a copper halide catalyst supported on magnesium fluoride. The catalyst was prepared by admixing copper chloride with magnesium fluoride in a 1:5 mol ratio. The mixture was slurried with water evaporated by drying at 150° C. and pelleted.

TABLE III

Copper halide on $MgF_2$

| S. N. | Reactor, °C. | Contact time, seconds | M./min. $CF_2Cl-CH_3$ | Gas samples | | | | | Activity, percent | Conversion, percent | Selectivity, percent |
|---|---|---|---|---|---|---|---|---|---|---|---|
| | | | | $CF_2Cl-CH_3$ | $CF_2=CH_2$ | $CH_2=CFCl$ | $CF_3-CH_3$ | $CH_2-CCl_2$ | | | |
| 1 | 450 | 20 | 0.018 | 96.3 | 3.4 | 0.2 | 0.1 | | 3.7 | 3.4 | 92.0 |
| 2 | 500 | 20 | .018 | 91.0 | 8.5 | 0.3 | 0.2 | | 9.0 | 8.5 | 94.5 |
| 3 | 500 | 10 | .038 | 93.9 | 5.8 | 0.2 | 0.1 | | 6.1 | 5.8 | 95.0 |
| 4 | 500 | 5 | .076 | 96.3 | 3.5 | 0.2 | 0.0 | | 3.7 | 3.5 | 94.5 |
| 5 | 550 | 20 | .018 | 73.9 | 25.5 | 0.4 | 0.2 | | 26.1 | 25.5 | 97.5 |
| 6 | 550 | 10 | .038 | 81.7 | 17.9 | 0.3 | 0.1 | | 18.3 | 17.9 | 97.5 |
| 7 | 550 | 5 | .076 | 92.4 | 7.3 | 0.2 | 0.1 | 0.0 | 7.6 | 7.3 | 96.0 |
| 8 | 600 | 20 | .018 | 53.7 | 45.4 | 0.7 | 0.2 | | 46.3 | 45.4 | 98.0 |
| 9 | 610 | 10 | .038 | 53.4 | 45.7 | 0.7 | 0.2 | | 46.6 | 45.7 | 98.0 |
| 10 | 610 | 5 | .076 | 73.6 | 25.8 | 0.5 | 0.1 | | 26.4 | 25.8 | 97.5 |

The following table illustrates runs made under conditions equivalent to the preceding copper catalyzed runs, except that the reaction was effected on a silica tube. The selectivity of a thermal reaction is obviously very poor.

TABLE IV

*Thermal dehydrohalogenation of $CF_2Cl\text{—}CH_3$*

| Reactor temp., ° C. | $CF_2Cl\text{—}CH_3$ moles/min. | Seconds residence time [1] | Mole percent in effluent gases | | | | $CF_2=CH_2$ / $CH_2=CFCl$ |
|---|---|---|---|---|---|---|---|
| | | | $CF_2Cl\text{—}CH_3$ | $CH_2=CF_2$ | $CH_2=CFCl$ | $CH_3\text{—}CF_3$ | |
| 300 | 0.018 | 26 | 100.0 | 0 | 0 | 0 | |
| 500 | .018 | 26 | 97.5 | 1.0 | 1.2 | 0.3 | |
| 500 | .038 | 14 | 99.2 | 0.2 | 0.5 | 0.1 | |
| 500 | .076 | 6 | 99.5 | 0.0 | 0.4 | 0.1 | |
| 600 | .018 | 26 | 35.8 | 46.4 | 14.9 | 2.7 | 3.1 |
| 600 | .038 | 14 | 63.8 | 26.0 | 8.8 | 1.2 | 3.0 |
| 600 | .076 | 6 | 90.2 | 6.4 | 3.0 | 0.4 | 2.1 |
| 700 | .018 | 26 | 3.6 | 64.0 | 30.7 | 1.2 | 2.1 |
| 700 | .038 | 14 | 1.5 | 60.8 | 36.1 | 1.1 | 1.7 |
| 700 | .076 | 6 | 8.0 | 51.0 | 40.0 | 0.7 | 1.3 |

[1] Residence times calculated at S. T. P. as before.

From the above data it can be seen that by operating within a critical contact or residence time-temperature range and employing a copper catalyst, selective dehydrochlorination reactions may be effected. The copper catalyst may be either metallic copper a copper salt or an alloy or mixture of copper with another metal. When alloys and mixtures are used, the other metals should preferably be non-catalytic or else the selectivity of the reaction may be reduced. For example, when cobalt-copper and silver-copper catalysts were employed, approximately equimolar quantities of vinylidene fluoride and vinylidene fluorochloride were produced, or in other words the reaction was non-selective. Alloys which may be used in effecting the process of this invention, are brass, bronze, and Monel metal. The preferred catalyst is metallic copper.

As indicated previously, the copper catalyst may be used in pellet form supported on a suitable carrier. Inert carriers are magnesium fluoride and the alkaline earth fluorides. Magnesium fluoride is preferred. Other support materials, such as alumina, sodium chloride and magnesium oxide appear to act as dehydrofluorination catalysts and their use in conjunction with copper would effect the selectivity of the reaction. For example, reactions carried out in the presence of aluminum chloride under suitable temperature conditions, yielded only vinylidene fluorochloride, while reactions carried out with magnesia yielded at least equimolar quantities of side products.

The vaporous effluent from the reaction zone, which contains large quantities of acid produced by the dehydrochlorination reaction is condensed in a suitable trap. The condensed acid-containing effluent is then bubbled through a water tower and washed free of acid. The acid-free product is dried and because of the low concentration of impurities may be used directly in the polymerization reactions for which it is intended, or may be fractionally distilled to remove trace impurities, if desired.

Various alterations and modifications of the present invention will become apparent to those skilled in the art without departing from the scope of this invention.

Having thus described our invention, we claim:
1. A process for producing vinylidene fluoride which comprises heating a 1,1-difluorochlorethane at a temperature between about 500° C. and about 730° C. for a period of time between about 1 and about 60 seconds in the presence of a copper catalyst selected from the group consisting of metallic copper, alloys of copper with non-catalytic metals and copper salts.
2. The process of claim 1 wherein the copper catalyst is metallic copper.
3. The process of claim 1 wherein the copper catalyst is brass.
4. The process of claim 1 wherein the copper catalyst is a copper halide supported on an alkaline earth fluoride.
5. A process for producing vinylidene fluoride which comprises heating 1,1,1-chlorodifluoroethane at a temperature between about 625° C. and about 675° C. for a period of time between about 5 and about 30 seconds in the presence of a copper catalyst selected from the group consisting of metallic copper, alloys of copper with non-catalytic metals and copper salts.
6. A process for producing vinylidene fluoride which comprises heating 1-chloro-2,2-difluoroethane at a temperature between about 625° C. and about 675° C. for a period of time between about 5 and about 30 seconds in the presence of a copper catalyst selected from the group consisting of metallic copper, alloys of copper with non-catalytic metals and copper salts.

References Cited in the file of this patent

UNITED STATES PATENTS

| | | |
|---|---|---|
| 2,504,919 | Bordner | Apr. 18, 1950 |
| 2,551,573 | Downing et al. | May 8, 1951 |
| 2,566,807 | Padbury et al. | Sept. 4, 1951 |
| 2,615,925 | Bordner | Oct. 28, 1952 |

FOREIGN PATENTS

| | | |
|---|---|---|
| 513,162 | Belgium | Aug. 14, 1952 |

UNITED STATES PATENT OFFICE
CERTIFICATE OF CORRECTION

Patent No. 2,774,799                                                             December 18, 1956

Russell M. Mantell et al.

It is hereby certified that error appears in the printed specification of the above numbered patent requiring correction and that the said Letters Patent should read as corrected below.

Columns 3 and 4, TABLE I, in the footnote thereto, strike out "on Page 4"; TABLE II, in the heading of the eighth column thereof, for "CH=CFCl" read -- $CH_2=CFCl$ --.

Signed and sealed this 19th day of February 1957.

(SEAL
Attest:

KARL H. AXLINE                                                  ROBERT C. WATSON
Attesting Officer                                          Commissioner of Patents